Dec. 23, 1952  H. WALDVOGEL  2,622,444
VIBRATING APPLIANCE
Filed April 10, 1951

HANS WALDVOGEL
INVENTOR his ATTYS.

Patented Dec. 23, 1952

2,622,444

UNITED STATES PATENT OFFICE 2,622,444

VIBRATING APPLIANCE

Hans Waldvogel, Zurich, Switzerland

Application April 10, 1951, Serial No. 220,223

2 Claims. (Cl. 74—26)

It is known that unbalanced gyrating masses, which are set quickly rotating round a shaft, cause centrifugal forces which, with a sufficient speed of rotation create vibrations over the bearings of the shaft. These are utilised, for instance, to effect the compacting of loose material, such as gravelly earth, cement concrete, etc. The gyrating masses then utilised for rotating about a shaft create a circular vibration, i. e. these vibratory forces act uniformly in all directions of the plane of oscillation.

Now there are numerous cases in which an action of the vibratory forces is not necessary in all directions, or in which a vibration in certain directions must even be expressly prevented.

In order to allow the vibrations to come into action only in the vertical direction, jarring machine or vibrators have been designed in which the vibratory forces acting in any other than the required working direction are eliminated.

This is attained by setting the vibrators into rotation in pairs, each two vibrators being arranged symmetrically with equally large gyrating masses and rotating at the same speed but in opposite directions.

With this method it is attained that the gyrating masses of two vibrators together, if they are arranged for instance in a horizontal plane, perform the maximum work in the vertical direction or plane in the moment when the gyrating masses in their rotation round the axis of swing have reached their highest position or, on the contrary, their lowest position. If the gyrating masses set themselves symmetrically towards each other or away from each other, the vibratory forces cancel each other, and the working effect of the vibration is in these two positions equal to nil. In each phase of the rotation of the gyrating masses, the effect varies from a maximum to a minimum. Nevertheless the vibration is also efficacious in the said horizontal planes. The structure of the vibrator must take up and absorb this as tensile or compressive stresses. This manner of constructing vibrators is adopted, for example, in the case of surface vibrators or shaking screens.

Figure 1:
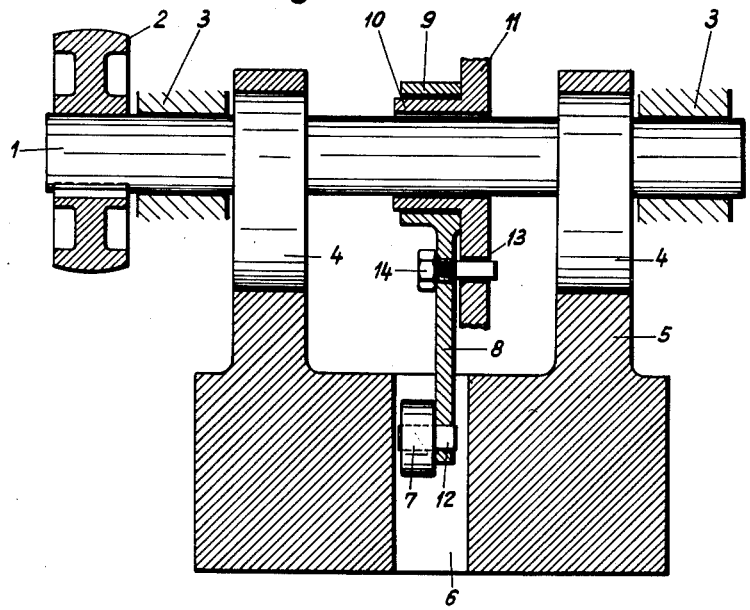
Figure 2:
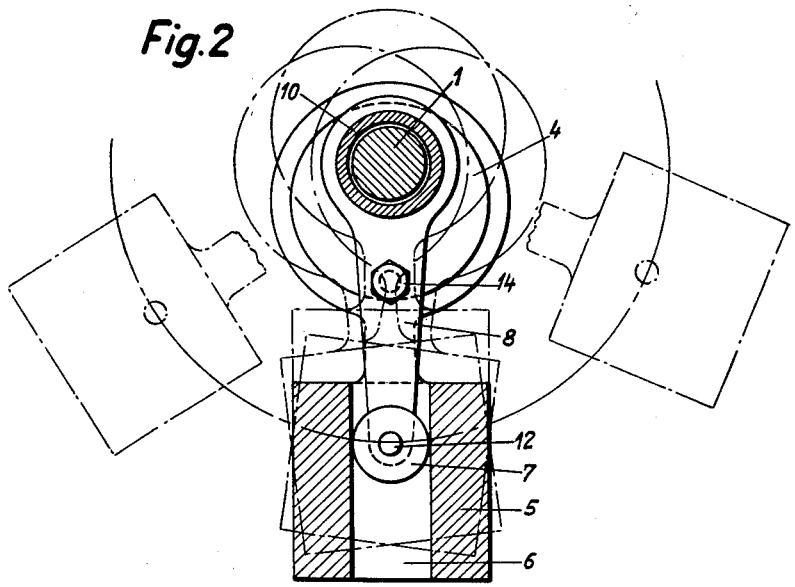

The object of the present invention is a vibrating appliance which to a great extent avoids the above-mentioned drawbacks and makes it possible to allow the gyrating mass to act in quite exactly predetermined directions. According to the invention, a mass that can reciprocate only linearly is provided and is connected to an eccentric drive, for instance to an eccentric shaft. In the accompanying drawing one form of execution of a vibrating appliance according to the invention is illustrated diagrammatically and by way of example, where:

Fig. 1 shows a longitudinal section and Fig. 2 a cross-section, various possible positions of the gyrating mass being indicated.

In the drawing, the reference numeral 1 denotes a shaft which is keyed to a pulley 2 and can be set rotating by the same. The shaft 1 supported in bearings 3, carries eccentric discs 4 which fit into suitable holes in the mass 5. Naturally, bearing shells of the usual construction, not shown in the drawing, can be provided. In the mass 5 a guide 6 of rectangular cross-section is provided, in which the arm 8 carrying the roller 7 enters. The arm 8 is in one piece with the hub 9, which can rotate round the bush 10 of a disc 11 and thus round the axis of the shaft 1. The roller 7, rotatable round the bolt 12, corresponds in its diameter to the width of the guide 6, as can be seen from Fig. 2. The arm 8 is adjustable with respect to the stationary disc 11, in that this disc has holes 13 in a circle round the axis of the shaft 1, into which holes the threaded bolt 14 can enter. In this manner it is possible to set the direction of the arm in differently directed positions and to secure the arm in each working position. As can be seen, the guide 6 is in the middle between the two eccentric discs 4, so that guiding with a minimum of stresses is obtained. Fig. 2 shows different possible positions of the mass 5.

As compared with known vibrating appliances, the described construction has the advantage that the driving energy transmitted to the shaft 1 is utilised to the maximum.

What I claim is:

1. A vibrating appliance with at least one oscillating mass, an eccentric drive coupled to the said mass and a guiding member for the said mass arranged so as to allow only a reciprocating linear movement of the same, the said guiding member being swivelable round the axis of the driving shaft of the eccentric drive, two eccentric discs rotatably carried in the oscillating mass being arranged on the driving shaft, and the guiding member including a roller guided in a recess in the mass, the roller being adjustable and fixable round the axis of the driving shaft of the eccentric drive.

2. A vibrating appliance as claimed in claim 1, wherein the roller is adjustable in different positions by means of a setbolt.

HANS WALDVOGEL.

REFERENCES CITED

The following references are of record in the file of this patent:

UNITED STATES PATENTS

| Number | Name | Date |
| --- | --- | --- |
| 1,654,815 | Jubien et al. | Jan. 3, 1928 |
| 1,657,727 | Stubbs | Jan. 31, 1928 |